H. H. MILLER.
COMBINED HARROW AND CULTIVATOR.
No. 186,864.  Patented Jan. 30, 1877.
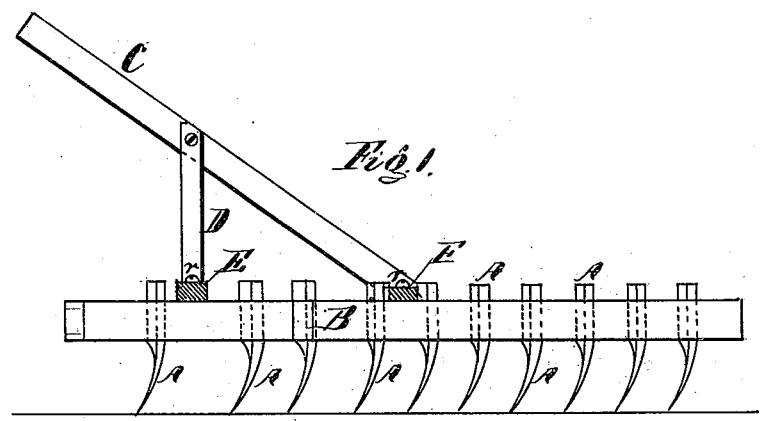
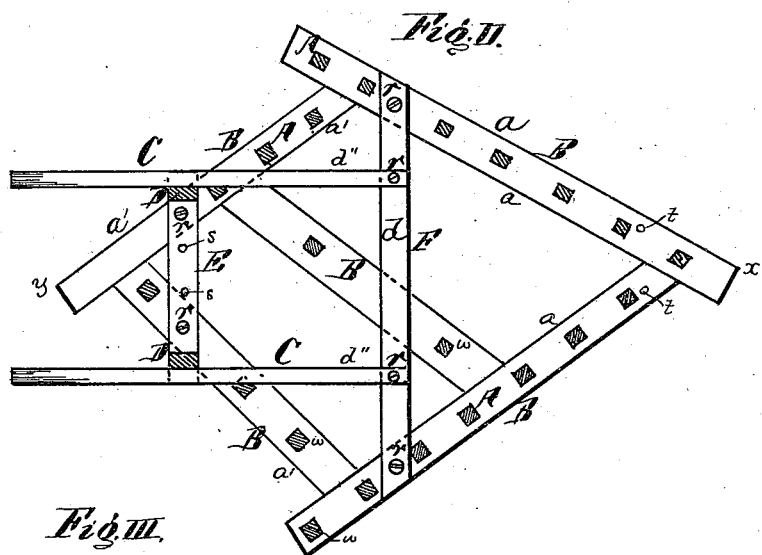
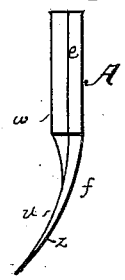
Witnesses:
Inventor:
Henry H. Miller.

UNITED STATES PATENT OFFICE.

HENRY H. MILLER, OF NEWVILLE, PENNSYLVANIA.

IMPROVEMENT IN COMBINED HARROW AND CULTIVATOR.

Specification forming part of Letters Patent No. 186,864, dated January 30, 1877; application filed July 8, 1876.

*To all whom it may concern:*

Be it known that I, HENRY H. MILLER, of Newville, in the county of Cumberland and State of Pennsylvania, have invented certain Improvements in Combined Harrows and Cultivators, of which the following is a specification:

The object of my invention is a combined harrow and cultivator, constructed, as described hereafter, to run with either end forward, with adjustable handles and with teeth of such a form as to insure a secure hold in the frame, reduce the weight, and act effectually in reducing the soil.

In the drawing, Figure 1 is an elevation of my improved harrow and cultivator; Fig. 2, a plan view; Fig. 3, an elevation of one of the teeth, and Figs. 4 and 5 sections of a tooth.

The frame B of the implement consists of bars $a\ a\ a'\ a'$, arranged so that the angle at one end, $x$, shall be more more acute than at the other, and to the frame is secured the handle-frame C, consisting of cross-bars F E, standards D, and inclined bars $d''$. The handle-frame is secured to the frame B by screws or bolts $r$, and in the cross-piece E are two series of openings, $s$, one adapted to coincide with openings $t$ near the end $x$, and the others with openings near the opposite end, so that the handle may be adjusted to either end of the frame. The teeth A are secured on the frame, as usual, each tooth consisting of a square shank, $e$, and a curved blade, $f$, which, when the tooth is in position, is bent from the end $x$ of the frame. Each tooth is set angularly with the edge $w$ of the shank toward the end $y$ of the frame, and below the shank each tooth is cut away, removing the edge $w$, and forming a flat curved face, $u$, reducing the blade of the tooth to a triangular form in cross-section, with the sharp curved edge $z$ opposite the curved flat face $u$.

When the implement is drawn with the blunt end $y$ forward it acts effectually as a cultivator, raising and opening the soil. When drawn in the opposite direction the inwardly-curved sharp edges divide and break up and pulverize the soil, and at the same time tend to level the same, the handle being readily adjusted to enable the operator to regulate the implement when traveling in either direction.

As it is difficult to secure the harrow-teeth firmly in the frame, if they are small in size, I form each tooth with the thick rectangular stock $e$, which has a wide bearing, and is not likely to yield under pressure; but as a tooth of this thickness throughout would be heavy and expensive, I reduce the blade to a triangular form, as above described, thereby reducing the weight, forming the flat face $u$, needed in lifting the soil, and the sharp edge $z$ required to pulverize it, while the curved faces on opposite sides of said edge tend to level it.

Important advantages result from making one of the angular ends of the implement less acute than the other.

It will be seen that the blunt and heaviest end is the cultivator end. The weight of this end causes the teeth to penetrate well into the soil, and prevent the implement from jumping, while the lighter end is more readily steadied and guided by the operator.

In running as a harrow, with the sharp end foremost, the heavy end will balance the implement, preventing it from jumping, while the curved teeth slide readily over and smooth the soil.

I do not claim, broadly, either adjustable handles or curved teeth.

I do not claim a harrow with one end blunt; nor do I claim a harrow having curved teeth or a reversible handle, all these parts separately considered being old; but

I claim—

1. The combination, in a harrow, of a frame pointed at both ends, but with one end sharper than the other, provided with reversible handles, and teeth curved toward the blunt end, as herein set forth.

2. The teeth A, each having a square stock, $e$, and a triangular curved blade, $f$, with the concave face $u$ flat, and the convex face beveled to a sharp edge, $z$, as specified.

HENRY H. MILLER.

Witnesses:
 WILLIAM BARR,
 W. F. KLINK.